United States Patent
Koury, Jr. et al.

[11] Patent Number: 6,070,464
[45] Date of Patent: Jun. 6, 2000

[54] SENSING STRUCTURE COMPRISING A MOVABLE MASS AND A SELF-TEST STRUCTURE

[75] Inventors: Daniel Nicolos Koury, Jr., Mesa; Ronald James Gutteridge, Paradise Valley, both of Ariz.

[73] Assignee: Motorola, Inc., Schaumburg, Ill.

[21] Appl. No.: 08/926,319

[22] Filed: Sep. 5, 1997

[51] Int. Cl.[7] .................................................. G01P 15/125
[52] U.S. Cl. .................... 73/514.32; 73/1.38; 73/862.626
[58] Field of Search ........................ 73/514.32, 514.36, 73/514.18, 514.16, 1.38, 1.37, 862.626, 862.68; 361/280, 283.3

[56] References Cited

U.S. PATENT DOCUMENTS

| | | | |
|---|---|---|---|
| 5,146,389 | 9/1992 | Ristic et al. ............................. | 361/283 |
| 5,511,420 | 4/1996 | Zhao et al. ............................. | 73/514.22 |
| 5,565,625 | 10/1996 | Howe et al. ........................... | 73/514.16 |
| 5,569,852 | 10/1996 | Marek et al. .......................... | 73/514.32 |
| 5,574,222 | 11/1996 | Offenberg .............................. | 73/514.32 |
| 5,618,989 | 4/1997 | Marek .................................... | 73/514.32 |
| 5,880,369 | 3/1999 | Samuels et al. ....................... | 73/514.32 |

*Primary Examiner*—Helen C. Kwok
*Attorney, Agent, or Firm*—A. Kate Huffman

[57] ABSTRACT

A sensing structure (10) formed overlying a substrate (50), for example a semiconductor substrate, has a movable mass (12) substantially split into two halves with a self-test structure disposed between the two halves. The self-test structure has a plurality of single-capacitor actuators for displacing the movable mass. Each actuator is formed by a movable finger (18) connected to the movable mass and a fixed finger (44) mounted by an anchor to the substrate. Each actuator is shielded by a fixed shield finger (42) so that all actuators force the movable mass in a common direction.

25 Claims, 2 Drawing Sheets

SENSING STRUCTURE COMPRISING A MOVABLE MASS AND A SELF-TEST STRUCTURE

BACKGROUND OF THE INVENTION

The present invention relates, in general, to sensing structures and, more particularly, to sensing structures comprising a movable mass, such as found in an accelerometer, and a self-test capability for verifying proper operation of the movable mass.

Sensors are one type of electronic device using a movable mass. In particular, accelerometers use a movable mass to detect acceleration. Typically, a differential capacitor is connected to the movable mass, and motion of the mass is detected by a sensing circuit coupled to the differential capacitor.

Accelerometers used in air-bag deployment systems require a self-test capability under conditions closely resembling an actual crash event. Typical surface-micromachined silicon accelerometers accomplish this self-test function by creating an electrostatic attraction of the movable or seismic mass by biasing an electrode in the sensor. However, unless the forces of electrostatic attraction are applied symmetrically about the center of mass, the resulting imbalance can cause rotational motion of the mass. For a linear acceleration sensor, this rotational or angular motion can produce errors, and in extreme cases permanently disable the sensor.

Accordingly, there is a need for an accelerometer with a self-test capability in which the movable mass structure can be displaced in purely linear fashion along the sensitive axis.

DETAILED DESCRIPTION OF THE DRAWINGS

Figure 1:
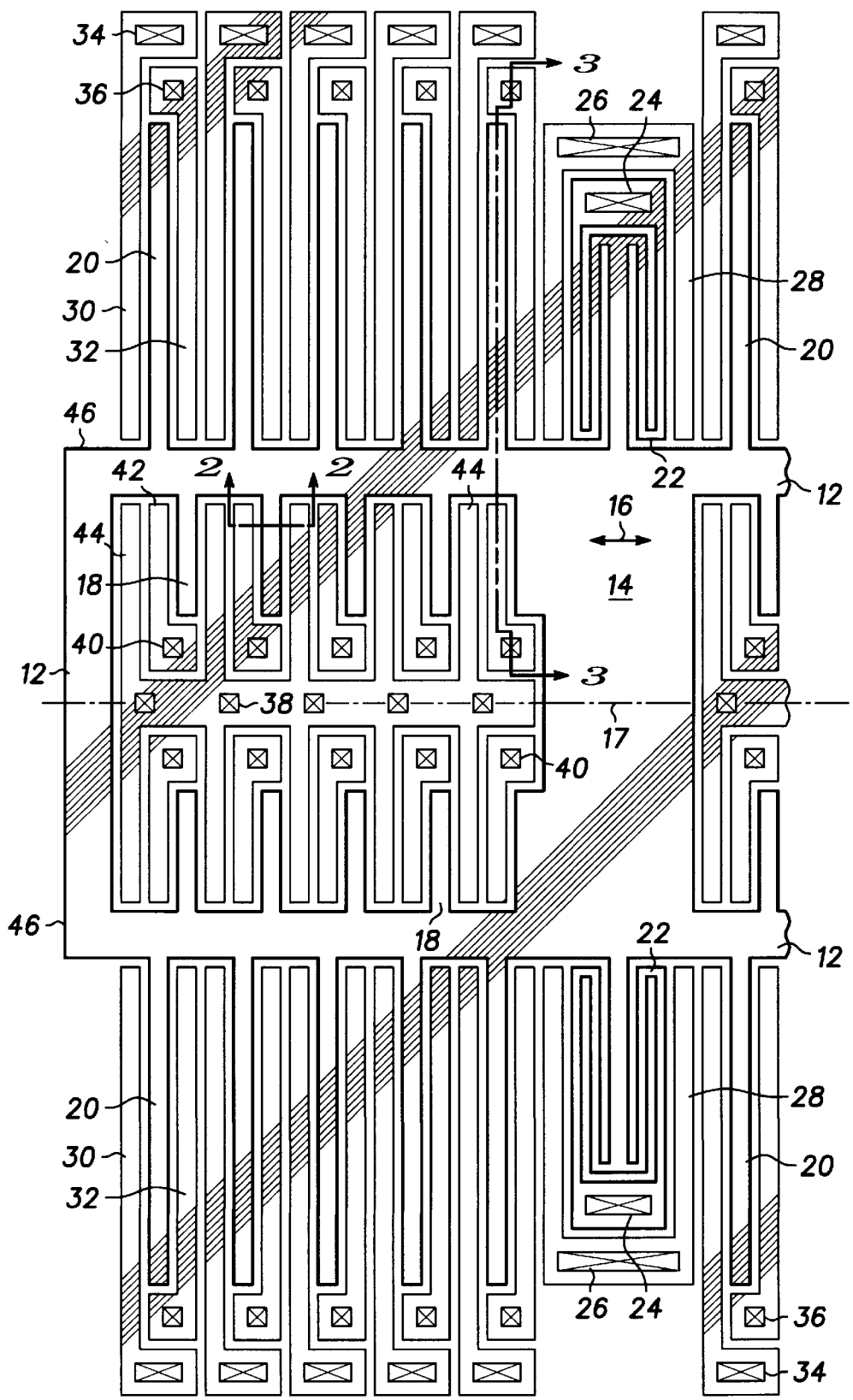
FIG. 1 is a top schematic view of a sensing structure according to the present invention.

FIG. 1 is a top schematic view of a sensing structure 10 according to the present invention, which in the specific embodiment described herein is used in an accelerometer. Sensing structure 10 has a movable mass 12 that moves in response to acceleration forces in a plane substantially parallel to an underlying substrate 50 (see FIGS. 2 and 3). Substrate 50 is preferably a semiconductor substrate, but other substrate materials may be used. Only an end portion of sensing structure 10 and movable mass 12 is shown in FIG. 1. In an actual device the portions of the layout shown in FIG. 1 would be replicated as needed to form the full device.

It should be appreciated that according to the present invention, the central portions of movable mass 12 have one or more central openings in which self-test structures are formed. In other words, movable mass 12 is generally split into two major portions or halves, with the self-test structures formed in the interior region between these two halves, as will be described in more detail below. Generally, many fingers protrude from each major lengthwise portion or member of mass 12 with self-test fingers protruding inwardly and sensing fingers protruding outwardly. Such a split structure provides improved resistance to rotational motion compared to prior lateral accelerometers having a self-test feature. Further, as the length of movable mass 12 is extended to accommodate an increased number of sensing capacitors, cross-members 14 are added as needed to maintain the rigidity of movable mass 12.

Movable mass 12 generally moves in a lateral direction indicated by bi-directional motion axis arrow 16, which corresponds to the sensitive axis or direction. Motion axis 16 is substantially parallel to a centerline 17 of movable mass 12. Movable self-test fingers 18 and movable sensing fingers 20 are part of movable mass 12. Also, self-test fingers 18 and sensing fingers 20 are illustrated here as offset from one another. However, this offset is not necessary and in other embodiments fingers 18 and 20 could be patterned directly across from one another. Movable mass 12 is supported at regular intervals by suspension structures 22, and a suspension shield 28 substantially surrounds and electrically shields suspension 22 against electrostatic forces from nearby fingers. Anchors 26 and 24 mount shield 28 and suspension 22 to underlying substrate 50 (see FIG. 3). Fixed sensing fingers 30 and 32, which are mounted to substrate 50, and movable sensing fingers 20 are substantially parallel to provide a plurality of differential sensing capacitors. A typical width, for example, of each finger shown in FIG. 1 is about 3.5 microns with a typical spacing between fingers of about 1.5 microns.

Fixed self-test fingers 44 are mounted by anchors 38 to be substantially parallel to movable self-test fingers 18 so that a plurality of single-capacitor self-test actuators are provided in the central openings of movable mass 12. In other words, these self-test actuators are disposed inside a region 46 roughly determined by the outside perimeter of the two major halves of movable mass 12, which are disposed substantially symmetrically about centerline 17. The self-test actuators are electrically shielded by fixed shield fingers 42, which are mounted to substrate 50 by anchors 40, and maintained at substantially the same potential as mass 12 so that an electrostatic attraction force created by biasing self-test fingers 44 relative to mass 12 will act in a single direction on movable mass 12. Fixed shield fingers 42 must be placed in substantially equal numbers as movable self-test fingers 18 to provide this shielding function. Fixed shield fingers 42 may also be electrically connected to movable mass 12 to assure they are at substantially the same potential as mass 12.

Figure 3:
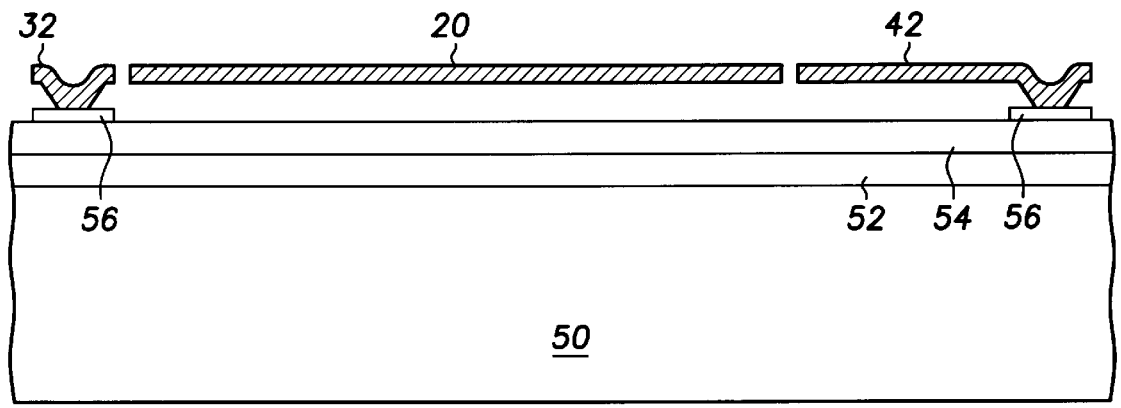

It should be noted that the fingers, shields, movable mass, and suspension structures shown in FIG. 1 are patterned from a single upper layer, which is conductive, as illustrated in FIG. 3. As used herein "conductive" is intended to mean that either a material is a true conductor such as a metal or that the material has been doped or otherwise treated to improve its electrical conductivity such as by doping a semiconductor material. Only the layout pattern of this upper layer is shown in FIG. 1 for ease of illustration. Also, the anchors shown in FIG. 1 correspond to the location of vias formed in a sacrificial layer as part of the manufacturing process as shown in FIG. 3 and discussed below.

Figure 2:
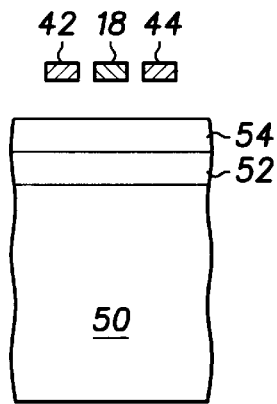
FIGS. 2 and 3 are cross-sectional views corresponding to the sensing structure illustrated in FIG. 1.

FIGS. 2 and 3 are cross-sectional views corresponding to the accelerometer illustrated in FIG. 1. In FIG. 2, fingers 18, 42, and 44 are shown suspended overlying substrate 50. A dielectric layer 54 and a dielectric layer 52 have been formed on the top surface of substrate 50. Although not shown, a travel stop is used to limit the maximum distance that movable mass 12 can move to ensure that movable finger 18 does not collide with other fingers in sensing structure 10 during operation. Note that fixed shield finger 42, being located adjacent to movable self-test finger 18 opposite to fixed self-test finger 44, minimizes any electrostatic force which would directly oppose the self-test electrostatic force applied by fixed self-test finger 44. If fixed shield finger 42 were removed, fixed self-test finger 44 would apply a smaller opposing force on movable self-test finger 18 as well as the larger intended force.

In FIG. 3, fixed sensing finger 32, movable sensing finger 20, and fixed shield finger 42 each have been formed from a common upper conductive layer (not shown). This layer is a precursor layer that has been formed as a blanket layer, for example of heavily-doped polysilicon, and then patterned to provide fingers 20, 32, and 42, along with the other patterned structures as shown in FIG. 1. The upper layer can also be formed from metals or other semiconductor materials that are doped to improve electrical conductivity. The anchors of FIG. 1 correspond to points where the patterned upper conductive layer makes contact to a lower conductive layer 56. Alternatively, in other cases, instead of using lower conductive layer 56, the patterned upper conductive layer can be anchored to dielectric layer 54. Lower conductive layer 56, also formed for example of heavily-doped polysilicon, may be patterned to provide electrical interconnect between electrically common fingers and other portions of sensing structure 10.

Lower conductive layer 56 also preferably has been patterned to include a shield (not shown) formed on the surface of dielectric layer 54. The shield is preferably provided to extend under almost all of movable mass 12 and the other portions of sensing structure 10 except where limited by those portions of lower conductive layer 56 that have been patterned to provide electrical interconnect as mentioned above. A shield driver circuit (not shown) is electrically coupled to the shield and holds it at substantially the same potential as movable mass 12.

The manufacture of sensing structure 10 can be done using conventional techniques except as discussed herein with respect to the novel structure of the present invention. Examples of prior sensor structures having a movable mass are described in U.S. Pat. No. 5,565,625, issued on Oct. 15, 1996, titled SENSOR WITH SEPARATE ACTUATOR AND SENSE FINGERS, by Howe et al. and U.S. Pat. No. 5,146,389, issued on Sep. 8, 1992, titled DIFFERENTIAL CAPACITOR STRUCTURE AND METHOD, by Ristic et al., which are hereby incorporated by reference.

Figure 4:
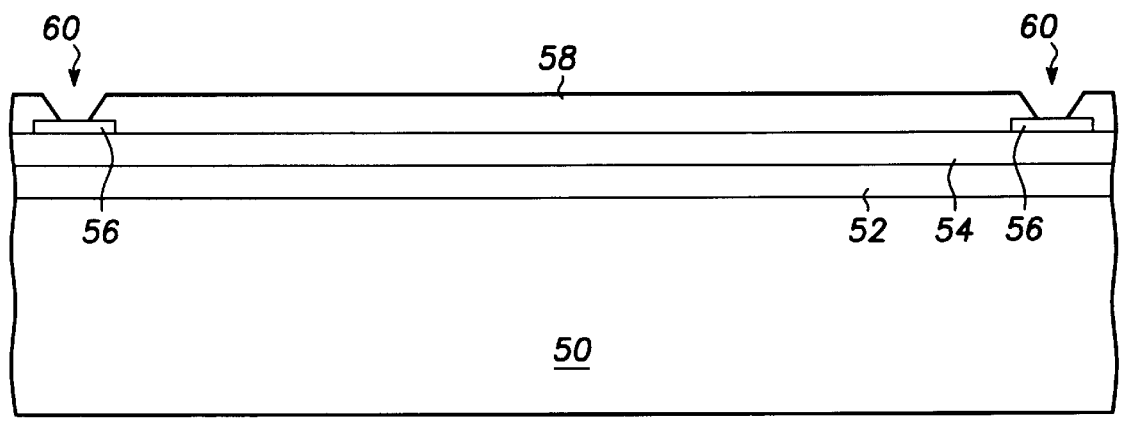
FIG. 4 is a cross-sectional view of an intermediate step in the manufacture of the sensing structure as illustrated in FIG. 3.

FIG. 4 is a cross-sectional view of an intermediate step in the manufacture of sensing structure 10 illustrated in FIG. 3. Specifically, referring to FIG. 4, a semiconductor substrate 50, for example of doped silicon, has dielectric layer 52 formed thereon, for example, by thermal oxidation to provide a silicon oxide layer of about 2 microns. Dielectric layer 54 is next formed, for example, by chemical vapor deposition of silicon nitride to a thickness of about 0.2 microns. Thick dielectric layer 52 serves to reduce parasitic capacitance between the device and the substrate. Nitride layer 54 protects layer 52 during the removal of sacrificial layer 58.

Lower conductive layer 56 is formed as a blanket layer over dielectric layer 54, for example, by low pressure chemical vapor deposition of polysilicon to a thickness of about 0.35 microns, and then patterned as discussed above. A sacrificial layer 58, for example of phosphosilicate glass (PSG) with a thickness of about 2.0 microns, is formed overlying dielectric layer 54. Vias 60 are formed in sacrificial layer 58 and correspond to locations where anchors are to be formed.

After vias 60 are formed, a blanket upper layer (not shown), for example of polysilicon, is formed overlying sacrificial layer 58 and then patterned to provide the fingers and other structures as discussed above and shown in FIG. 3. This upper layer is made conductive either during or after formation of the blanket layer to provide the fingers of the sensing structure with electrical conductivity. For example, this blanket polysilicon layer can be heavily doped in-situ or after formation.

After the upper layer is patterned, another sacrificial layer (not shown), for example of PSG, is formed over the entire sensing structure to protect it during subsequent processing, for example used to form transistor regions or metallization on other portions of the substrate containing the sensing structure. After completing such other processing, these sacrificial layers, which includes layer 58, are removed to release the fingers and movable mass 12 as shown in FIG. 3.

Figure 5:
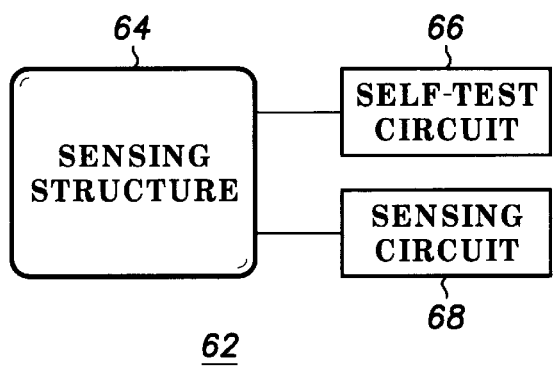
FIG. 5 is a block schematic diagram of a sensing system including the sensing structure of FIG. 1.

FIG. 5 is a block schematic diagram of a sensing system 62 including sensing structure 10. Sensing system 62, for example, corresponds to an accelerometer. In FIG. 5, a sensing structure 64, which corresponds to sensing structure 10 of FIG. 1, is electrically coupled to a self-test circuit 66 and a sensing circuit 68. Specifically, fixed self-test fingers 44 are coupled to self-test circuit 66, and fixed sensing fingers 30 and 32 are coupled to sensing circuit 68. An important advantage of the present invention is that the self-test circuit 66 and sensing circuit 68 can be electrically independent. Thus, activation of the self-test function of sensing structure 10 to displace movable mass 12 will not electrically interfere or create distortion in the sensing of this displacement through undesired changes in potentials or duty cycles of signals applied to the plurality of differential sense capacitors. This avoids false indications of sensor failure or readiness because sensing circuit 68 operates in its normal sensing mode (i.e. the same mode used during normal operation of the sensor).

During normal operation of sensing structure 10, fixed self-test fingers 44, fixed shield fingers 42, and movable self-test fingers 18 are all biased at substantially the same electric potential, thus disabling the self-test feature and preventing any adverse electric fields.

During self-test operation, fixed shield fingers 42 and movable self-test fingers 18 are electrically biased to substantially the same electric potential so that fixed self-test fingers 44 will create an electrostatic attraction force that acts on movable mass 12 in only one direction. During self-test, fixed self-test fingers 44 are biased to a potential sufficiently different from movable self-test fingers 18 to displace movable mass 12.

Also, suspension shield 28 and movable mass 12 are maintained at substantially the same electric potential. Biasing of the fingers and shields as described above is readily done through the electrical interconnect patterned from lower conductive layer 56. The electrical interconnect is connected to biasing circuitry (not shown) using a conventional approach.

By now, it should be appreciated that there has been provided a novel structure for a sensing structure having a movable mass and a self-test feature. The central disposition of self-test actuators in a split movable mass as shown herein provides the advantage of improved linearity of motion. Further, for a fixed structure length, finger pitch, and sense capacitance, the central positioning of the self-test structure results in a structure with shorter sensing fingers, which reduces problems with flexure and stiction. The fixed shield fingers used in the self-test structure result in a more efficient conversion of potential difference to force than would be the case in their absence. This can result in a smaller, less costly sensing structure. They also result in a more planar structure following the forming of the overlying sacrificial layer. This planarity makes any subsequent processing steps easier, and thus improves manufacturability.

The present invention has been described above with respect to an accelerometer. However, the present invention also can be used in other applications such as micromechanical relays, safing switches, and the like. It should also be noted that two sensing structures as described above can be positioned orthogonally on a single substrate to provide a two-directional (i.e. X-Y axis) accelerometer unit.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A sensing structure comprising:
    a movable mass positioned overlying a substrate and moving in a direction corresponding to a sensitive axis wherein said movable mass moves relative to said substrate and said movable mass comprises a first mass portion and a second mass portion disposed on opposite sides of a centerline of said movable mass wherein said centerline is substantially parallel to said sensitive axis;
    a movable self-test finger protruding from said first mass portion;
    a fixed self-test finger fixedly mounted to said substrate; and
    wherein said movable self-test finger and said fixed self-test finger are disposed between said first mass portion and said second mass portion.

2. The sensing structure of claim 1 further comprising:
    a movable sensing finger protruding from said first mass portion and a fixed sensing finger mounted to said substrate and disposed relative to said movable sensing finger so as to provide a sensing capacitor; and
    wherein said fixed self-test finger is electrically coupled to a self-test circuit and said fixed sensing finger is electrically coupled to a sensing circuit.

3. The sensing structure of claim 2 wherein said substrate is a semiconductor substrate.

4. The sensing structure of claim 2 wherein said self-test circuit and said sensing circuit operate electrically independently.

5. The sensing structure of claim 1 wherein said movable mass moves in a plane substantially parallel to said substrate.

6. The sensing structure of claim 5 wherein said substrate comprises silicon and said movable mass comprises polysilicon.

7. The sensing structure of claim 6 wherein said substrate and said movable mass are doped.

8. A sensing structure comprising:
    a movable mass disposed overlying a substrate and moving in a direction corresponding to a sensitive axis, the movable mass comprising a first mass portion and a second mass portion disposed on opposite sides of a centerline of said movable mass wherein said centerline is substantially parallel to said sensitive axis; and
    a fixed self-test finger disposed between said first mass portion and said second mass portion.

9. The sensing structure of claim 8 further comprising:
    a movable self-test finger protruding from said first mass portion and
    said movable self-test finger and said fixed self-test finger are each disposed within said perimeter.

10. The sensing structure of claim 8 wherein said movable mass moves in a plane substantially parallel to said substrate.

11. The sensing structure of claim 9 wherein said movable self-test finger, said fixed self-test finger, and said movable mass are disposed in a substantially common plane.

12. A sensing structure comprising:
    a movable mass disposed overlying a substrate and comprising a first mass portion and a second mass portion; and
    a fixed self-test finger disposed between said first mass portion and said second mass portion;
    a movable self-test finger protruding from said first mass portion and wherein:
        said movable mass moves in a direction corresponding to a sensitive axis;
        said first mass portion and said second mass portion are each disposed substantially symmetrically about a centerline of said movable mass and together form at least a portion of a perimeter of said movable mass wherein said centerline is substantially parallel to said sensitive axis; and
        said movable self-test finger and said fixed self-test finger are each disposed within said perimeter; and
    a fixed shield finger disposed substantially parallel to said movable self-test finger and wherein said fixed self-test finger and said movable self-test finger are disposed substantially parallel to each other to provide a single-capacitor self-test actuator.

13. The sensing structure of claim 12 wherein said sensing structure forms a portion of an accelerometer.

14. The sensing structure of claim 12 wherein during a self-test operation of said sensing structure (i) said fixed shield finger and said movable self-test finger are biased to substantially the same electric potential and (ii) said fixed self-test finger is biased to an electric potential sufficiently different from said movable self-test finger so that said movable mass is displaced during said self-test operation.

15. The sensing structure of claim 12 further comprising a movable sensing finger protruding from said first mass portion in a direction substantially opposite from said movable self-test finger.

16. The sensing structure of claim 15 further comprising a first fixed sensing finger and a second fixed sensing finger disposed on opposite sides of said movable sensing finger to provide a differential sensing capacitor.

17. The sensing structure of claim 16 wherein said differential sensing capacitor is electrically coupled to a sensing circuit and said self-test actuator is electrically coupled to a self-test circuit and wherein said sensing circuit and said self-test circuit are electrically independent.

18. The sensing structure of claim 8 further comprising:
    a suspension connected to said movable mass; and
    a suspension shield surrounding at least a portion of said movable mass wherein said suspension shield and said movable mass are maintained at substantially the same electric potential.

19. A sensing structure comprising:
    a movable mass overlying a semiconductor substrate wherein a central portion of said movable mass comprises at least one central opening, and the movable mass moving in a direction corresponding to a sensitive axis, and comprising a first mass portion and a second mass portion disposed on opposite sides of a centerline of said movable mass wherein said centerline is substantially parallel to said sensitive axis; and a plurality of fixed self-test fingers disposed inside said central opening.

20. The sensing structure of claim 19 wherein said fixed self-test fingers are disposed substantially parallel to a plurality of corresponding movable self-test fingers each being a part of said movable mass and protruding inward towards said central opening so as to provide a plurality of single capacitor self-test actuators.

21. The sensing structure of claim 20 wherein said sensing structure is an acceleration sensing structure and said plurality of fixed self-test fingers is disposed substantially symmetrically about a centerline of said movable mass.

22. A sensing structure comprising:

a movable mass overlying a semiconductor substrate wherein a central portion of said movable mass comprises at least one central opening;

a plurality of fixed self-test fingers disposed inside said central opening wherein said fixed self-test finders are disposed substantially parallel to a plurality of corresponding movable self-test fingers each a part of said movable mass and protruding inward towards said central opening so as to provide a plurality of single capacitor self-test actuators, and wherein said sensing structure is an acceleration sensing structure and said plurality of fixed self-test fingers is disposed substantially symmetrically about a centerline of said movable mass; and a plurality of fixed shield fingers each disposed substantially parallel to a corresponding one of said plurality of movable self-test fingers.

23. A method of forming a sensing structure comprising:

forming a movable mass overlying a substrate wherein said movable mass moves in a direction corresponding to a sensitive axis, said movable mass moves relative to said substrate, and said movable mass comprises a first mass portion and a second mass portion disposed on opposite sides of a centerline of said movable mass wherein said centerline is substantially parallel to said sensitive axis;

forming a movable self-test finger protruding from said first mass portion and disposed between said first mass portion and said second mass portion; and forming a fixed self-test finger fixedly mounted to said substrate and disposed between said first mass portion and said second mass portion.

24. The method of forming said sensing structure of claim 23 wherein said step of forming said movable self-test finger comprises:

forming a sacrificial layer overlying said substrate;

forming an upper layer overlying said sacrificial layer;

patterning said upper layer to provide at least said movable self-test finger; and removing said sacrificial layer.

25. The method of forming said sensing structure of claim 24 wherein said step of forming said fixed self-test finger comprises:

forming a lower layer overlying said substrate;

patterning said lower layer to provide an anchor as part of a patterned lower layer;

forming a via in said sacrificial layer at a location overlying said anchor;

wherein said sacrificial layer is formed overlying said lower layer; and wherein said step of patterning said upper layer provides said fixed self-test finger mounted to said anchor.

* * * * *

UNITED STATES PATENT AND TRADEMARK OFFICE
CERTIFICATE OF CORRECTION

PATENT NO. : 6,070,464
DATED : June 6, 2000
INVENTOR(S) : Daniel N. Koury, Jr. et al.

Page 1 of 1

It is certified that error appears in the above-identified patent and that said Letters Patent is hereby corrected as shown below:

Column 7, claim 22,
Line 25, delete "finders" and replace with -- fingers --.

Signed and Sealed this

Nineteenth Day of March, 2002

Attest:

Attesting Officer

JAMES E. ROGAN
*Director of the United States Patent and Trademark Office*